United States Patent [19]

Peterson et al.

[11] 4,416,924

[45] Nov. 22, 1983

[54] POLYCARBONATE SIZING FINISH AND METHOD OF APPLICATION THEREOF

[75] Inventors: Howell L. Peterson, New Providence; Paul E. McMahon, Chatham, both of N.J.

[73] Assignee: Celanese Corporation, New York, N.Y.

[21] Appl. No.: 422,105

[22] Filed: Sep. 23, 1982

[51] Int. Cl.³ .............................................. B05D 7/26
[52] U.S. Cl. .............................. 427/388.1; 427/389.8; 427/389.9; 427/434.6; 428/375; 428/412; 524/104
[58] Field of Search ............... 427/434.6, 388.1, 389.8, 427/389.9; 428/375, 412; 524/104

[56] References Cited

U.S. PATENT DOCUMENTS

| | | | |
|---|---|---|---|
| 2,997,459 | 8/1961 | Schnell et al. | 260/47 |
| 3,028,365 | 4/1962 | Schnell et al. | 260/47 |
| 3,065,204 | 11/1962 | Dietrich et al. | 260/47 |
| 3,580,730 | 5/1971 | Grabowski | 428/412 |
| 3,919,167 | 11/1975 | Mark | 524/104 |

FOREIGN PATENT DOCUMENTS 48-16705  5/1973  Japan .................................. 524/104

*Primary Examiner*—Shrive P. Beck
*Attorney, Agent, or Firm*—Herbert P. Price

[57] ABSTRACT

An improved polycarbonate sizing finish is provided comprised of a polycarbonate dissolved in a solvent mixture comprising N-methyl-2-pyrrolidone (NMP) and an alcohol having from 1 to 4 carbon atoms. The use of such a solvent mixture enables a relatively constant concentration of polycarbonate to be maintained, and consequently, enables a sized product fiber to be provided having a substantially uniform polycarbonate concentration thereon. In addition, the solvent may be readily and substantially completely removed from the sized fiber.

10 Claims, No Drawings

POLYCARBONATE SIZING FINISH AND METHOD OF APPLICATION THEREOF

BACKGROUND OF THE INVENTION

The present invention is directed to polycarbonate sizing compositions and method of application thereof.

Various types of fibers such as carbon fibers have been employed as reinforcement in composite structures for some time. In an attempt to enhance the physical characteristics of such fibers as reinforcing agents, the fibers have been coated or sized with various compounds such as polycarbonates.

Typically, such polycarbonate sizing finishes are applied to the fiber from a sizing bath comprised of the polycarbonate dissolved in a methylene chloride solvent. A concentration of polycarbonate on the order of about 6 percent by weight is generally employed in such baths in an attempt to provide a finished fiber having a concentration of about 2 percent by weight of polycarbonate thereon. However, since methylene chloride evaporates very readily, it is difficult to maintain a substantially constant polycarbonate concentration in the bath during the sizing operation. As a result, the polycarbonate concentration on the finished fiber tends to vary significantly during the sizing operation.

As an alternative to the use of methylene chloride as a sizing solvent, it has been suggested that N-methyl-2-pyrrolidone (NMP) be employed. While NMP is a suitable solvent for polycarbonates, the solvent is not easily removed from the finished fiber. However, it is desirable to remove substantially all of the solvent from the fiber to avoid undesirably modifying the physical characteristics of the fiber as well as to prevent interference with the composite performance at the fiber-matrix interface.

OBJECTS AND SUMMARY OF THE INVENTION

It is therefore an object of the present invention to provide a solvent for use in polycarbonate sizing compositions which will enable a substantially constant polycarbonate bath concentration to be maintained.

It is also an object of the present invention to provide a solvent for use in the sizing of a fiber which can be substantially completely and readily removed from the sized fiber.

It is further an object of the present invention to provide a method of sizing a fiber with a polycarbonate whereby fibers are provided having substantially uniform amounts of polycarbonate thereon.

In accordance with one aspect of the present invention, in a method of applying a polycarbonate finish to a fiber whereby said fiber is contacted with a sizing composition which comprises a polycarbonate dissolved in a solvent, said solvent subsequently being removed from said fiber, the improvement wherein said solvent comprises a major amount of N-methyl-2-pyrrolidone and a minor amount of an alcohol having from 1 to 4 carbon atoms.

In accordance with another aspect of the present invention, there is provided a polycarbonate sizing composition comprising a polycarbonate dissolved in a solvent which comprises a major amount of N-methyl-2-pyrrolidone and a minor amount of an alcohol having from 1 to 4 carbon atoms.

DETAILED DESCRIPTION OF THE INVENTION

It has been discovered that the use of a sizing composition comprised of a polycarbonate dissolved in a solvent which comprises a major amount of N-methyl-2-pyrrolidone and a minor amount of an alcohol having from 1 to 4 carbon atoms enables fibers to be sized having substantially uniform concentrations of polycarbonate applied thereto. The term "size" is used herein to distinguish the fiber coating from the impregnating resin which constitutes the matrix of a composite structure in which such fibers can be employed.

The polycarbonate resin which may be employed in the present invention may comprise any of the known resins such as those marketed by General Electric Company under the trademark Lexan. Suitable resins can be produced by the reaction of phosgene and bisphenol A (4,4′-dihydroxydiphenol-2,2′-propane) or by ester exchange between bisphenol A and diphenyl carbonate. An additional example of a suitable polycarbonate resin is a resin marketed by Mobay Chemical Company under the trademark Merlon. Polycarbonate resins and their methods of preparation are well-known in the art and will not be discussed in greater detail herein.

The fibers to which the polycarbonate resin may be applied as part of the sizing operation can consist of a variety of fibers which will not dissolve in the sizing composition. For example, the method of the present invention can be successfully employed to apply a polycarbonate finish to carbon fibers.

The terms "carbon" fibers or "carbonaceous" fibers are used herein in the generic sense and include graphite fibers as well as amorphous carbon fibers which result after a thermal carbonization or graphitization treatment. Graphite fibers are defined herein to consist substantially of carbon and have a predominant X-ray diffraction pattern characteristic of graphite. Amorphous carbon fibers, on the other hand, are defined as fibers in which the bulk of the fiber weight can be attributed to carbon and which exhibit a predominantly amorphous X-ray diffraction. Graphite fibers generally have a higher Young's modulus than do amorphous carbon fibers and in addition are more highly electrically and thermally conductive. Numerous procedures have been employed for the conversion of various organic polymeric fibrous materials to a carbonaceous form while retaining the original fibrous configuration essentially intact. Such procedures have in common the thermal treatment of a fibrous precursor in an appropriate atmosphere or atmospheres which is commonly conducted in a plurality of heating zones, or alternatively, in a single heating zone wherein the fibrous material is subjected to progressively increasing temperatures. See, for instance, U.S. Pat. No. 3,539,395 for a representative conversion process, the disclosure of which is herein incorporated by reference.

More specifically, organic polymeric precursor fibrous materials of the type described herein may be initially stabilized by treatment in an appropriate atmosphere at a moderate temperature (e.g., 200° to 400° C.), and subsequently heated in an inert atmosphere at a more highly elevated temperature, e.g., 900° to 1,000° C., or more, until a carbonaceous fibrous material is formed. If the thermally stabilized material is heated to a maximum temperature of 2,000° to 3,100° C. (preferably 2,400° to 3,100° C.) in an inert atmosphere, substantial amounts of graphite carbon are commonly detected in the resulting carbon fiber, otherwise the carbon fiber will commonly exhibit a substantially amorphous X-ray diffraction pattern.

The exact temperature and atmosphere utilized during the initial stabilization of an organic polymeric fibrous material commonly vary with the composition of the precursor as will be apparent to those skilled in the art. During the carbonization reaction, elements present in the fibrous material other than carbon (e.g., oxygen and hydrogen) are substantially expelled. Suitable organic polymeric fibrous materials from which the carbon fibers may be derived include an acrylic polymer, a cellulosic polymer, a polyamide, a polybenzimidazole, polyvinyl alcohol, pitch, etc. Acrylic polymeric materials are particularly suited for use as precursors in the formation of the carbon fibers. Illustrative examples of suitable cellulosic materials include the natural and regenerated forms of cellulose, e.g., rayon. Illustrative examples of suitable polyamide materials include the aromatic polyamides, such as nylon 6T, which is formed by the condensation of hexamethylenediamine and terephthalic acid. An illustrative example of a suitable polybenzimidazole is poly-2,2′-m-phenylene-5,5′-bibenzimidazole. Preferred carbonization and graphitization techniques for use in forming the carbon fibers ae described in commonly assigned U.S. Pat. Nos. 3,667,705; 3,775,520; and 3,900,556. Each of the disclosures of these patents is herein incorporated by reference.

Carbon fibers which typically are employed in preparing the composites described herein contain at least about 90 percent carbon by weight. In a preferred embodiment, the carbon fibers contain at least about 95 percent carbon by weight and exhibit a predominantly graphitic X-ray diffraction pattern.

Carbon fibers are generally employed in the configuration of a ribbon which may comprise a single flat tow of continuous carbon filaments or a plurality of substantially parallel multifilament fiber bundles which are substantially coextensive with the length of the ribbon.

In the latter embodiment, the carbon fiber bundles of the ribbon may be provided in a variety of physical configurations. For instance, the bundles of the ribbon may assume the configuration of continuous lengths of multi-filament yarns, tows, strands, cables, or similar fibrous assemblages. The multifilament bundles are preferably lengths of a continuous multifilament yarn. The fiber bundles within the ribbon optionally may be provided with a twist which tends to improve their handling characteristics. For instance, a twist of about 0.1 to 5 tpi, and preferably about 0.3 to 1 tpi, may be imparted to each fiber bundle. Also, a false twist may be used instead of or in addition to a real twist. Alternatively, the fiber bundles may possess substantially no twist.

Multifilament fiber bundles may be provided within the ribbon in a substantially parallel manner in the substantial absence of bundle crossovers to produce a flat ribbon. The number of parallel multifilament bundles present within the carbon fiber ribbon may be varied widely, e.g., from 6 to 1,000 or more. In one embodiment, a ribbon is selected having a weft pick interlaced with substantially parallel fiber bundles in accordance with the teachings of commonly assigned U.S. Pat. No. 3,818,082, which is herein incorporated by reference. It is not essential, however, that the parallel fiber bundles or the filaments of a flat tow be bound by any form of weft interlacement when constructing carbon fiber tapes for resin impregnation in accordance with the procedures described herein.

Preferably, the organic polymeric fibrous precursor is arranged in the desired configuration prior to the thermal treatment. The sizing composition is applied after the thermal treatment.

When carbon fibers are to be used in preparing composite structures with resin matrix systems, they are frequently subjected to a surface pretreatment to further improve the adhesion between the carbon fibers and the resin matrix. The fiber surface is usually oxidized in such a pretreatment, for example, by reaction with an oxidizing agent. Alternatively, the carbon fiber can be oxidized by electrolytic treatment using an electrolyte which will generate nascent oxygen at the surface of the carbon fiber during the electrolysis process. Preferred surface modification treatments are disclosed in commonly assigned U.S. Pat. Nos. 3,723,150; 3,723,607; 3,762,941; 3,767,774; 3,821,013; and 3,859,187 the disclosures of which are herein incorporated by reference. The sizing compositions of this invention do not detract from the adhesion improvement of such surface treated fibers.

While the present invention has been described in particular detail with respect to the use of carbon fibers, other types of reinforcing fibers are also suitable for use in the present invention. Such fibers include but are not limited to glass fibers, asbestos fibers, synthetic polymeric fibers, aluminum or aluminum oxide fibers, aluminum silicate fibers, titanium fibers, magnesium fibers, rock wool fibers, steel fibers and tungsten fibers.

The sizing composition consists of at least the polycarbonate resin and the specific solvent defined hereinafter. The solvent comprises an admixture of N-methyl-2-pyrrolidone (i.e., NMP) and an alcohol having from 1 to 4 carbon atoms. Preferably, the solvent mixture consists essentially of N-methyl-2-pyrrolidone and the alcohol.

It is desirable for the alcohol which is employed to possess certain physical characteristics in order to ensure that the desired objects of the present invention are attained. For example, the alcohol should exhibit a vapor pressure at standard conditions of less than about 50 mm while also having a boiling point below about 100° C. The alcohol is preferably substantially anhydrous. Such characteristics enable a sizing composition to be provided in which solvent loss by evaporation is minimized (thus maintaining the polycarbonate concentration therein substantially constant) while also permitting the solvent to be removed from the sized fiber at relatively low temperatures. Alcohols having from 1 to 4 carbon atoms generally exhibit such desirable characteristics and are thus preferred for use in the present invention. Ethanol is the most preferred alcohol for use in the solvent composition.

The respective weight ratios of the NMP and the alcohol employed in the solvent may vary within a wide range. For example, the NMP may be present in amounts ranging from about 50 to 90 percenty by weight, with the alcohol accordingly being present in amounts ranging from about 50 to 10 percent by weight. A preferred solvent mixture comprises about 80 percent by weight of NMP and about 20 percent by weight of the alcohol. The upper limit of the alcohol (a non-solvent for polycarbonates) which can be employed is dependent upon the amount of the alcohol which can be added without causing the polycarbonate to precipitate from the mixture as a result of the NMP concentration being decreased too greatly. As a general rule, the solvent mixture comprises a major amount of NMP and a minor amount of the alcohol.

The sizing composition can be prepared by simply initially dissolving the desired amount of the polycarbonate resin in an appropriate amount of NMP. Upon addition of the desired amount of the polycarbonate in the NMP, the alcohol is added incrementally with stirring in an amount insufficient to cause the polycarbonate to precipitate from solution. A typical sizing bath will generally contain about 6 percent by weight of the polycarbonate based on the total weight of the sizing composition. However, the polycarbonate concentration in the bath can vary from about 2 to 15 percent by weight, depending upon the amount of polycarbonate which is desired to be applied to the fiber.

The sizing composition can be applied to the fibers by known methods such as by drawing the fibers through a bath containing the composition or by spraying the size onto the fibers. In either instance the fibers must be dried to remove any residual solvent. A suitable apparatus for coating the carbon fibers with a sizing composition is illustrated in U.S. Pat. No. 3,914,504, the disclosure of which is herein incorporated by reference.

Typically a carbon fiber strand, or ribbon is passed into a solution comprising the sizing composition and then into a heated tube to remove the solvent and dry the fiber. The tube is heated by hot air (and preferably air mixed with nitrogen to prevent fires or explosions) forced through the inlet of the tube from a suitable source, such as an electric heat gun. The temperature of the heated gaseous medium is maintained sufficiently high to evaporate the solvent upon contact with the solution coated fibers. The strand or ribbon can alternatively be passed through a forced air circulation oven to remove the solvent.

Preferably, the polycarbonate concentration on the fiber subsequent to removal of the solvent will range from about 0.5 to 4.0 percent by weight, and most preferably will be about 2 percent by weight. It is desirable for the amount of residual solvent which remains subsequent to the drying step to be less than about 1 percent by weight, and preferably less than 0.1 percent by weight in order to avoid undesirable contamination of the product which could affect the properties thereof as a reinforcing fiber.

The amount of size on the fiber is determined by weighing a given length of sized fiber, then dissolving the size from the fiber using a solvent for the size, drying the fiber and then reweighing the unsized fiber. From the difference in the weights the percentage of size on the fiber, based on the weight of the fiber, is calculated.

The fibers coated with the sizing composition described herein are intended to be used in fiber reinforced composite structures. The term "composite structure" is intended to refer to a heterogeneous assembly comprised of two or more components, at least one of which defines a continuous phase which is hereinafter designated as the "matrix" component, and at least one other component defining reinforcing means or reinforcement for the said composite assembly, the reinforcing means being contiguous to and firmly bonded to the matrix component. For example, the respective components of such composite assemblies can be either coated, layered, stratified and/or laminated, randomly filled and the like.

Thus, such composite structures comprise the matrix component, and the reinforcing material which comprises fibers and the sizing composition described herein for the fibers. Generally, a thermoplastic polyester is used as the matrix component of the composite structure.

It has been found that the particular sizing composition described herein improves the adhesion of the fiber surface with certain thermoplastic polyesters employed as the matrix component of a composite structure.

More specifically, the thermoplastic polyesters employed as the matrix component in the fiber composites described herein include the poly(alkylene terephthalates, isophthalates or mixed terephthalates and isophthalates), wherein the alkylene groups contain from 2 to 4 carbon atoms. They are available commercially or can be prepared by known techniques, such as the alcoholysis of esters of phthalic acid with a glycol and subsequent polymerization, by heating glycols with the free acids or with halide derivatives thereof, and similar processes. These are described in U.S. Pat. No. 2,465,319 and 3,047,539, and elsewhere.

Although the glycol portion of such typical polyesters can contain from 2 to 4 carbon atoms, e.g., ethylene 1,3-propylene, 1,4-butylene, 1,3-butylene, 1,2-propylene, 1,2-butylene, and 2,3-butylene, it is preferred that it contain 3 or 4 carbon atoms, in the form of linear methylene chains.

Preferred polyesters will be of the family consisting of high molecular weight, polymeric 1,4-butylene glycol terephthalates or isophthalates and mixtures of such esters, including copolyesters of terephthalic acid and up to about 20% isophthalic acid. The most preferred thermoplastic polyester is poly(1,4-butylene terephthalate).

The molecular weight of the thermoplastic polyester preferably is such that it will exhibit an inherent viscosity (I.V.) of from about 0.65 to about 1.2 dl/gm, preferably from about 0.70 to about 0.80 dl/gm, as determined from a 0.1% by weight solution of the polymer in 100 milliliters of orthochlorophenol at 25° C.

The improved adhesion between the fibers and the thermoplastic polyester resin matrix is exhibited by improvements in interlaminar shear strength of the composite.

The composite fabrication technique may be selected from any of those procedures previously employed in the advanced engineering composite art. Typically, a composite structure is formed by impregnated individual lamina (e.g., carbon fiber layers, ribbons, plies, etc.) of sized carbon fibers arranged in the desired configuration with the thermoplastic polyester. The impregnation of the lamina may be conducted by applying the thermoplastic polyester to the same from either a solution and preferably from the melt. The impregnated lamina are then stacked as needed and molded with conventional molding techniques. Composite structures of more complex shapes may be formed by maintaining the thermoplastic resin in a plastic state.

The composite structures will generally constitute from about 1 to about 60 percent, and preferably from about 10 to about 40 percent by weight, sized fibers and correspondingly from about 40 to about 99 percent, and preferably from about 60 to about 90 percent, by weight, thermoplastic polyester based on the weight of the composite.

Such composite structures find utility in automotive and industrial applications where rapid cycling is desirable. For example, fenders, trunk lids, bumpers, and similar lightweight structural components may be formed by conventional molding or shaping techniques. Alternative uses of the aforedescribed composites include aircraft/aerospace application where high temperature performance is not critical, as well as structural members for housing, e.g., floor beams and the like.

The invention is additionally illustrated in connection with the following Examples which are to be considered as illustrative of the present invention. It should be understood, however, that the invention is not limited to the specific details of the Examples.

EXAMPLE 1

A sizing composition was formed by dissolving a polycarbonate resin marketed by General Electric Company under the tradename Lexan in N-methyl-2-pyrrolidone. Ethanol was incrementally added to the mixture thus formed. The sizing composition contains 6 percent by weight of the polycarbonate resin. The N-methyl-2-pyrrolidone and the ethanol were present in a weight ratio of 80:20.

The carbon fiber selected for sizing was a yarn of carbonaceous filamentary material derived from an acrylonitrile copolymer consisting of approximately 98 mole percent of acrylonitrile units and 2 mole percent of methylacrylate units. The carbonaceous material consisted of approximately 6000 substantially parallel filaments, containing approximately 93 percent carbon by weight, commercially available from the Celanese Corporation under the designation of Celion 6000. Representative average filament properties for the carbon fiber include a denier of 0.6, a tensile strength of approximately 470,000 psi, a Young's modulus of approximately 34 million psi, and an elongation of approximately 1.4 percent.

The carbon fiber was passed through a bath of the sizing composition at a speed of 10 meters per minute. The fiber upon passage through the bath picked up 1.9 percent by weight of the sizing composition. The fiber was dried by passage through a forced air circulation oven at 194° C. for one minute whereby the residual solvent was substantially completely removed.

EXAMPLE 2

A sizing composition was formed by dissolving 180 grams of a polycarbonate resin marketed by General Electric Company under the tradename Lexan in 2632 grams of N-methyl-2-pyrrolidone. Subsequently, 189 grams of anhydrous ethanol were added to the mixture. The sizing composition thus formed contained 6.3 percent by weight of the polycarbonate resin. The N-methyl-2-pyrrolidone and the ethanol were present in a weight ratio of 93:7.

Carbon fiber as employed in Example 1 was passed through a bath of the sizing composition at a speed of 10 meters per minute. The percent pickup by the fiber was 1.89 percent by weight. The fiber was passed continuously through a forced air circulation oven for a residence time of about one minute to substantially completely remove residual solvent.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. In a method of applying a polycarbonate finish to a fiber whereby said fiber is contacted with a sizing composition comprising a polycarbonate dissolved in a solvent, said solvent subsequently being removed from said fiber, the improvement wherein said solvent comprises a major amount of N-methyl-2-pyrrolidone and a minor amount of an alcohol having from 1 to 4 carbon atoms.

2. The method of claim 1 wherein said alcohol comprises ethanol.

3. The method of claim 1 wherein said polycarbonate is present in an amount ranging from about 2 to 15 percent by weight in said sizing composition.

4. The method of claim 3 wherein said polycarbonate is present in said sizing composition in an amount of about 6 percent by weight.

5. The method of claim 1 wherein said sizing composition is applied to said fiber by passing said fiber through a bath comprised of said composition.

6. The method of claim 1 wherein said solvent is removed by heating said sized fiber.

7. The method of claim 1 wherein said fiber is comprised of a material selected from the group consisting of carbon fibers, glass fibers, asbestos fibers, synthetic polymeric fibers, aluminum fibers, aluminum oxide fibers, aluminum silicate fibers, titanium fibers, magnesium fibers, rock wool fibers, steel fibers and tungsten fibers.

8. The method of claim 7 wherein said fiber is a carbon fiber.

9. The method of claim 1 wherein said sizing composition comprises from about 50 to 90 percent by weight of N-methyl-2-pyrrolidone and from about 50 to 10 percent by weight of said alcohol.

10. The method of claim 9 wherein said composition comprises about 80 percent by weight of N-methyl-2-pyrrolidone and about 20 percent by weight of said alcohol.

* * * * *